United States Patent
Aravena et al.

(10) Patent No.: US 11,153,436 B2
(45) Date of Patent: Oct. 19, 2021

(54) AUTOMATIC NUISANCE CALL MANAGEMENT

(71) Applicant: INTERNATIONAL BUSINESS MACHINES CORPORATION, Armonk, NY (US)

(72) Inventors: Carla Aravena, Winthrop, MA (US); Sandra Louise Kogan, Newton, MA (US); Jeffrey Amari, Braintree, MA (US); Kyle Slachta, Medfield, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/662,110

(22) Filed: Oct. 24, 2019

(65) Prior Publication Data

US 2021/0127002 A1    Apr. 29, 2021

(51) Int. Cl.
  *H04M 3/42*   (2006.01)
  *H04M 3/436*  (2006.01)
  *H04M 1/663*  (2006.01)
  *G10L 15/22*  (2006.01)

(52) U.S. Cl.
  CPC .......... *H04M 3/4365* (2013.01); *G10L 15/22* (2013.01); *H04M 1/663* (2013.01); *H04M 2201/40* (2013.01)

(58) Field of Classification Search
  CPC ... H04M 3/436; H04M 1/663; H04M 3/42059

USPC .................................................... 379/210.02
See application file for complete search history.

(56) References Cited

U.S. PATENT DOCUMENTS

| | | | |
|---|---|---|---|
| 7,933,389 B2 | 4/2011 | Kumar | |
| 8,599,836 B2 | 12/2013 | Van Buren | |
| 10,044,710 B2 | 8/2018 | Yap | |
| 2006/0264216 A1* | 11/2006 | Benco | H04W 4/16 455/445 |
| 2010/0246795 A1* | 9/2010 | Saha | H04M 3/436 379/210.02 |
| 2011/0026701 A1* | 2/2011 | Kirchhoff | H04L 65/1079 379/207.13 |
| 2016/0337349 A1 | 11/2016 | Bhaskaran | |
| 2018/0007199 A1* | 1/2018 | Quilici | H04M 15/06 |
| 2018/0295140 A1 | 10/2018 | Lu et al. | |

OTHER PUBLICATIONS

Iranmanesh et al., "A Voice Spam Filter to Clean Subscribers' Mailbox." International Conference on Security and Privacy in Communication Systems. Springer, Berlin, Heidelberg, 2012, pp. 1-23.

(Continued)

*Primary Examiner* — Rasha S Al Aubaidi
(74) *Attorney, Agent, or Firm* — James W. Kappos

(57) ABSTRACT

The exemplary embodiments disclose a system and method, a computer program product, and a computer system for managing nuisance calls. The exemplary embodiments may include collecting data from a call, extracting one or more features from the collected data, and identifying the call as a nuisance call based on applying one or more models to the extracted one or more features.

16 Claims, 5 Drawing Sheets

(56) References Cited

OTHER PUBLICATIONS

Jin et al. "Is voice transformation a threat to speaker identification?." 2008 IEEE International Conference on Acoustics, Speech and Signal Processing. IEEE, 2008, pp. 4845-4848.
Mell et al., "The NIST Definition of Cloud Computing", National Institute of Standards and Technology, Special Publication 800-145, Sep. 2011, pp. 1-7.
Tu et al. "Sok: Everyone hates robocalls: A survey of techniques against telephone spam." 2016 IEEE Symposium on Security and Privacy (SP). IEEE, 2016, pp. 320-338.
Vennila et al., "Detection of Human and Computer Voice Spammers Using Hidden Markov Model in Voice over Internet Protocol Network." Procedia computer science 115 (2017): 588-595.
Wang et al., "A speaker recognition based approach for identifying voice spammer." International Conference on Web Information Systems and Mining. Springer, Berlin, Heidelberg, 2012, pp. 1-8.

* cited by examiner

AUTOMATIC NUISANCE CALL MANAGEMENT

BACKGROUND

The exemplary embodiments relate generally to nuisance call management, and more particularly to managing nuisance calls based on call data.

It can be difficult to determine the identity of an unknown caller without answering the caller's call. Additionally, answering a call from an unknown caller may lead to accepting a nuisance call, such as a prank call, telemarketing call, silent call, obscene or threatening call, and the like. For example, a user could be anticipating a phone call from a prospective employer after an interview and may accept a phone call from an unknown number thinking the phone call was from the prospective employer. Instead, the user may answer the phone call and receive a telemarketing pitch.

SUMMARY

The exemplary embodiments disclose a system and method, a computer program product, and a computer system for managing nuisance calls. The exemplary embodiments may include collecting data from a call, extracting one or more features from the collected data, and identifying the call as a nuisance call based on applying one or more models to the extracted one or more features.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
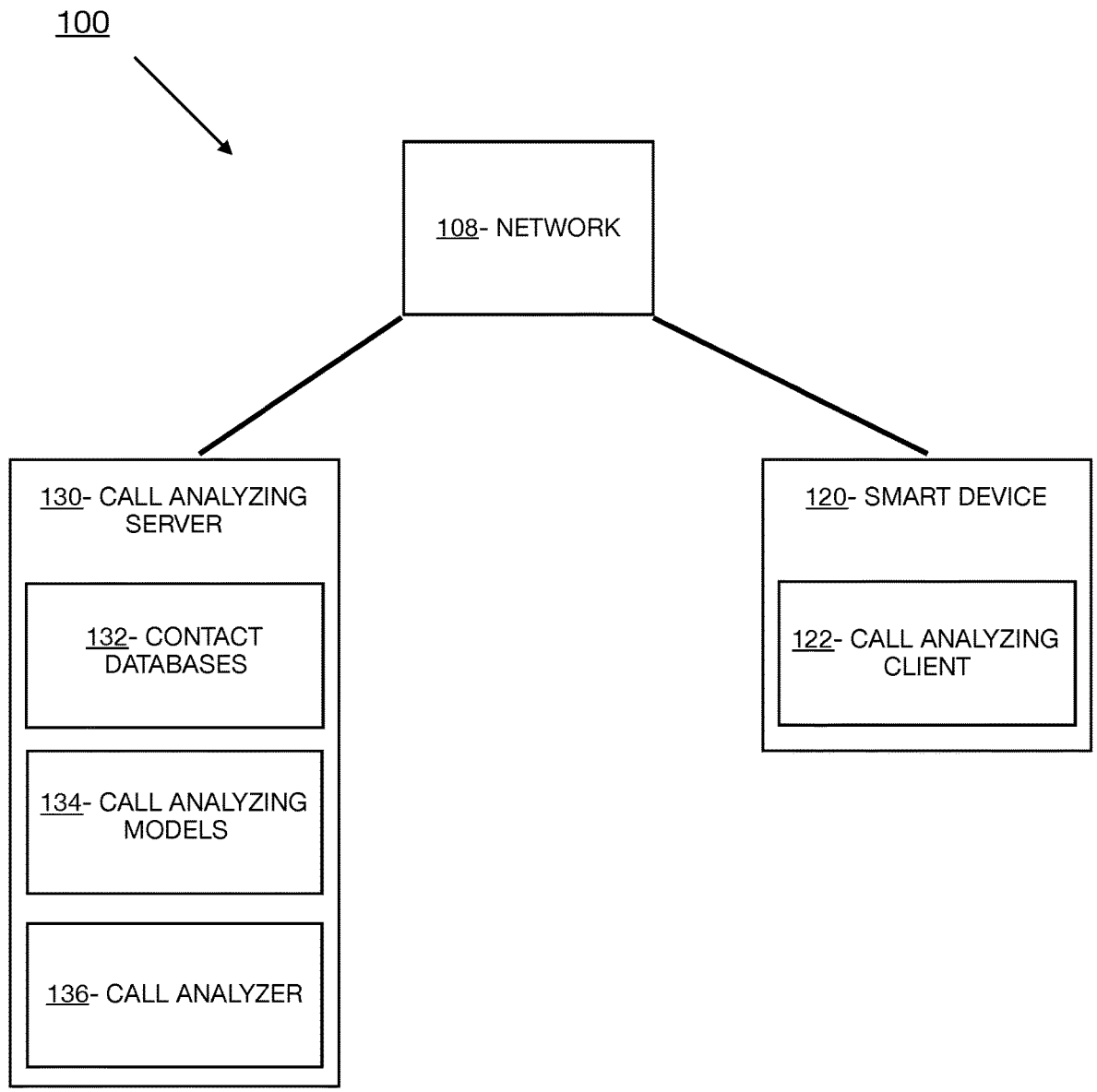
FIG. 1 depicts an exemplary schematic diagram of a nuisance call management system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

It can be difficult to determine the identity of an unknown caller without answering the caller's call. Additionally, answering a call from an unknown caller may lead to accepting a nuisance call, such as a prank call, telemarketing call, silent call, obscene or threatening call, and the like. For example, a user could be anticipating a phone call from a prospective employer after an interview and may accept a phone call from an unknown number thinking the phone call was from the prospective employer. Instead, the user may answer the phone call and receive a telemarketing pitch.

Hence, an independent system is needed to address the aforementioned problem. Exemplary embodiments of the present invention disclose a method, computer program product, and computer system that will identify nuisance calls based on contextual data. Accordingly, example embodiments are directed to a system that will identify nuisance audio and video calls. In embodiments, audio processing, video processing, and other data processing methods may be used to identify a nuisance caller. In particular, example embodiments may be configured for analyzing audio (e.g., speech), visual (e.g., facial features), and other contextual features for identifying a nuisance caller. Use cases of embodiments described herein may relate to improvement of, for example, but not limited to, caller management for an audio or video call over a landline telephone, wireless/mobile telephone, the internet, etc. In general, it will be appreciated that embodiments described herein may relate to caller management for any type of call over any network, such as an internet call, land line call, cellular phone call, radio call, etc.

FIG. 1 depicts the nuisance call management system 100, in accordance with the exemplary embodiments. According to the exemplary embodiments, the nuisance call management system 100 may include a smart device 120 and a call analyzing server 130, which may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the nuisance call management system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the example embodiment, the smart device 120 includes a call analyzing client 122, and may be an enterprise server, laptop computer, notebook, tablet computer, netbook computer, personal computer (PC), desktop computer, server, personal digital assistant (PDA), rotary phone, touchtone phone, smart phone, mobile phone, virtual device, thin client, IoT device, or any other electronic device or computing system capable of receiving and sending data to and from other computing devices. In embodiments, the smart device 120 may be comprised of a cluster or plurality of computing devices, in a modular manner, etc., working together or working independently. The smart device 120 is described in greater detail as a hardware implementation with reference to FIG. 3, as part of a cloud implementation with reference to FIG. 4, and/or as utilizing functional abstraction layers for processing with reference to FIG. 5.

The call analyzing client 122 may act as a client in a client-server relationship, and may be a software and/or hardware application capable of communicating with and providing a user interface for a user to interact with a server via the network 108. Moreover, in the example embodiment, the call analyzing client 122 may be capable of transferring data from the smart device 120 to other devices via the network 108. In embodiments, the call analyzing client 122 utilizes various wired and wireless connection protocols for data transmission and exchange, including Bluetooth, 2.4 gHz and 5 gHz internet, near-field communication, Z-Wave, Zigbee, etc. The call analyzing client 122 is described in greater detail with respect to FIG. 2.

In the exemplary embodiments, the call analyzing server 130 may include one or more contact databases 132, one or more call analyzing models 134, and a call analyzer 136, and may act as a server in a client-server relationship with the call analyzing client 122. The call analyzing server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the call analyzing server 130 is shown as a single device, in other embodiments, the call analyzing server 130 may be comprised of a cluster or plurality of computing devices, working together or working independently. The call analyzing server 130 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the contact databases 132 may be a collection of organized data which details the information of one or more individuals, businesses, corporations, entities, etc. In the example embodiment, data detailed by the contact databases 132 include relevant contact information, such as a name, email address, user name, internet protocol (IP) address, mailing address, telephone number, geographic location, time zone, building, office, device type, voiceprint, fingerprint, faceprint, etc. The contact databases 132 may further include information relating to one or more calls identified as nuisance calls, such as phone numbers, area codes, IP addresses, MAC addresses, faceprints, voiceprints, etc. In the example embodiment, the contact databases 132 are stored on call analyzing server 130. In other embodiments, however, the contact databases 132 may be stored elsewhere, such as on the smart device 120.

The call analyzing models 134 may be one or more algorithms modelling a correlation between one or more features extracted from collected call data and an identity of a caller or nuisance caller. In the example embodiment, the call analyzing models 134 may be generated using machine learning methods, such as neural networks, deep learning, hierarchical learning, Gaussian Mixture modelling, Hidden Markov modelling, and K-Means, K-Medoids, or Fuzzy C-Means learning, etc., and may include features such as a data match, background static, echo, feedback interference, muffling, background noise, tone, inflection, delay, cadence, etc. The call analyzing models 134 may weight the features based on an effect that the features have on accurately identifying a caller or nuisance caller such that features determined to be more associated with the correct identification of a caller or nuisance caller are weighted more than those that are not. The call analyzing models 134 are described in greater detail with reference to FIG. 2.

In the exemplary embodiments, the call analyzer 136 may be a software and/or hardware program capable of receiving a configuration. The call analyzer 136 may be further capable of detecting a call and prompting a caller of the call for identification. The call analyzer 136 may be further capable of collecting and processing a caller's data and determining whether the call is a nuisance call. Moreover, in some embodiments, the call analyzer 136 may be further capable of notifying a user that an incoming phone call is suspected to be a nuisance call. The call analyzer 136 is described in greater detail with reference to FIG. 2.

Figure 2:
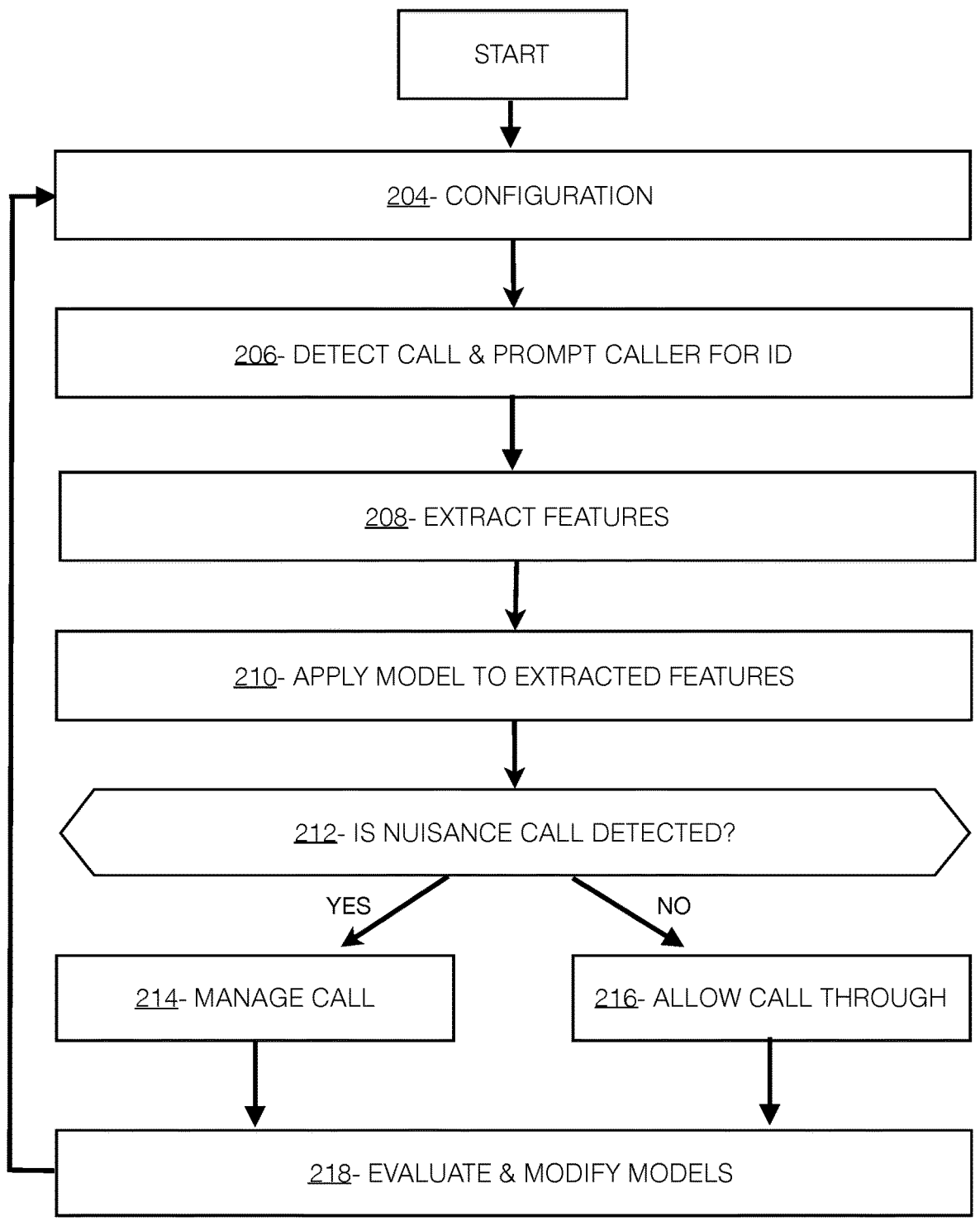
FIG. 2 depicts an exemplary flowchart illustrating the operations of a call analyzer 136 of the nuisance call management system 100 in managing nuisance calls, in accordance with the exemplary embodiments.

FIG. 2 depicts an exemplary flowchart illustrating the operations of the call analyzer 136 of the nuisance call management system in managing a nuisance call, in accordance with the exemplary embodiments.

The call analyzer 136 may receive a configuration (step 204). The call analyzer 136 may be configured by receiving information such as a user registration and user preferences. The user registration and user preferences may be uploaded by a user or administrator, i.e., the owner of the smart device 120 or the administrator of smart device 120. For example, the administrator may be an owner/user of the device, a guardian of a minor who uses the device, an employer of a phone-provided employee, etc. In the example embodiment, the configuration may be received by the call analyzer 136 via the call analyzing client 122 and the network 108. Receiving the user registration may involve receiving information such as a name, phone number, email address, account credentials (i.e., telephone account, video-chat/web conference, etc.), company name, serial number, smart device 120 type, and the like. Receiving a user registration may also involve receiving or extracting data from databases such as a user's phone contacts, email contacts, social media contacts, etc. For example, the call analyzer 136 may extract one or more phone numbers, email addresses, usernames, or account credentials associated with one or more friends, co-workers, entities, and other contacts having a relationship with the user. This information may be extracted from, for example, social networks, employee registries/databases, calendars/schedules, etc.

During configuration, the call analyzer 136 may further receive user preferences (step 204 continued). User preferences may include an option indicating whether a user would like to be notified of incoming calls identified as nuisance calls and, if so, one or more preferred methods of notifying the user, administrator, or both of the type of incoming calls, such as text message, email message, phone call, push notification, etc. User preferences may also include the one or more preferred sizes and colors of visual notification, as well as the preferred frequency and amplitude of any preferred audio notification. These various settings including color, size, frequency, amplitude, etc., and may be customized to vary for the receipt of a notification for a call that is likely to be a nuisance call and a call that is unlikely to be a nuisance call. For example, a notification for an incoming nuisance call may appear on a user's smart device 120 in red font, while a notification for an incoming call that is unlikely to be a nuisance call may appear on a user's smart device 120 in green font. In the event that the smart device 120 display utilizes a user interface on its display, user preferences may also encompass any modifiable settings pertaining to the user interface. For example, the preferred information to be displayed on a user's smart device 120 such as number of calls, number of nuisance calls, number of good/non-nuisance calls, number of features indicative of an identified caller, number of features indicative of an unidentified caller, and the like may be a customizable user preference.

To further illustrate the operations of the call analyzer 136, reference is now made to an illustrative example where a user uploads a user registration along with a link to a cell phone contacts database. The user also uploads user preferences indicating that they do not wish to be notified of incoming calls that are suspected to be nuisance calls, and that they prefer the call analyzer 136 automatically reject those incoming calls suspected of being nuisance calls. Lastly, the user indicates that they would like to receive a weekly summary of all rejected calls via email.

The call analyzer 136 may detect a call and prompt a user for identification/purpose (step 206). Upon receiving a call, the call analyzer 136 may prompt the caller to introduce themselves and/or provide a purpose for the call by playing a recorded or automated audio, video, text, etc. message. The message may be pre-recorded and available by default or personalized by the user. For example, the call analyzer 136 may play a recorded message of the user simply saying, "Hello." In other embodiments, the call analyzer 136 may play a recorded message of the user saying, "Hello, please state your name and reason for calling."

With reference again to the previously introduced example, the call analyzer 136 detects the user receiving a phone call from a caller and prompts the caller with the audio message, "Hello, please state your name and reason for calling."

The call analyzer 136 may extract features from the call (step 208). Such features may be extracted from the audio, video, and/or communication data of the call, and may include name, username, phone number, IP address, MAC address, web address, email address, geography, employee/student/serial number, a sample audio recording, a sample video recording, caller faceprint, caller voiceprint, caller fingerprint, caller dialogue/content, delay, silence, tone, inflection, background noise, static, etc. In order to collect this data, the call analyzer 136 may collect data received by the smart device 120 from the caller via the call analyzing client 122 and the network 108. For example, when receiving voice calls, the program may extract a phone number and corresponding caller name via caller ID functions and/or reverse lookup. In embodiments implementing voice over internet protocol (VOIP) or internet-based communications, the program may extract a username, IP address, MAC address, web address, email address, etc. associated with a device and corresponding caller name via the network 108 and an internet directory.

In addition to caller phone number, IP address, name, etc., the call analyzer 136 may further extract additional features from the audio and/or video of the call (step 208 continued). For example, the call analyzer 136 may extract a voiceprint (i.e., spectrogram) of the caller from an audio feed based on the spectrum of frequencies within the caller's voice. In addition, the call analyzer 136 may extract a faceprint of the caller based on facial recognition and image analysis of a video feed. In addition, the call analyzer 136 may extract words and sentences from the call and implement natural language processing, natural language understanding, topic modelling, and other techniques to determine a topic of, transcribe, translate, record, forward, etc. the call. Moreover, the call analyzer 136 may further note silences, delays, tone, inflection, static, background noise, and other features present within the call. For example, the call analyzer 136 may extract a delay based on the absence of dialogue, extract background noise as noise during a delay, and extract silences from the call based on an absence of dialogue or background noise. The call analyzer 136 may further extract tone, inflection, cadence, and other voice characteristics of the caller using audio analysis and processing techniques. In embodiments, the call analyzer 136 may extract features from the call data until the call analyzer 136 determines that the call has ended.

With reference to the example above wherein the user receives the phone call and the call analyzer 136 prompts the user to state their name and purpose, the call analyzer 136 extracts a phone number and name of the caller via caller identification. Moreover, the call analyzer 136 extracts a voiceprint of the user, the presence of one or more delays, and a topic of the call as "sales" via natural language processing.

The call analyzer 136 may apply one or more models to the extracted features (step 208 continued). In embodiments, the call analyzer 136 may apply the one or more analyzing models 134 to the extracted features to compute a confidence score as to whether an incoming call is a nuisance call. As previously mentioned, such extracted features may include name, username, phone number, IP address, MAC address, web address, email address, geography, employee/student/serial number, a sample audio recording, a sample video recording, caller faceprint, caller voiceprint, caller fingerprint, caller dialogue/content, delay, silence, tone, inflection, background noise, static, etc., and the one or more call analyzing models 134 may be generated through machine learning techniques such as neural networks.

Moreover, the call analyzer 136 may weight the extracted features (step 210 continued). In embodiments, the one or more call analyzing models 134 may be trained at initialization and/or through the use of a feedback loop to weight the features such that features shown to have a greater correlation with the identity of a nuisance caller are weighted greater than those features that are not. For example, an incoming call from a number matching or similar to (e.g., different extension) that of a friend within the contact databases 132 may not be weighted while an incoming call from an area code associated with nuisance calls may be weighted moderately. In another example, a caller voiceprint or faceprint matching that of a friend within the contact databases 132 may not be weighted while a call having many delays and irrelevant responses to the provided prompt may be weighted heavily. In embodiments, the call analyzing models 134 may assign a weight to each extracted feature in order to identify nuisance calls.

Based on the weightings assigned by the call analyzing models 134, the call analyzer 136 may determine a feature score for features identified within an incoming call (step 210 continued). For example, the features and weights may be represented by numeric values and the call analyzer 136 may multiply the features by the weights to compute a feature score for each feature extracted from the call. The call analyzer 136 may then sum the feature scores to compute a confidence score for the call, and compare the confidence score to a threshold, with scores exceeding the threshold identified as nuisance. For example, the call analyzer 136 may identify calls having a confidence score exceeding a threshold of 50% as nuisance calls.

With reference again to the previously introduced example where call analyzer 136 has extracted the caller name, phone number, voiceprint, one or more delays, and the topic of the call as "sales," the call analyzer 136 applies the call analyzing models 134 to the extracted features to compute a confidence score of 79.

The call analyzer 136 may determine if a nuisance call is detected (decision 212). In the example embodiment, the call analyzer 136 determines if a nuisance call is detected based on comparing the computed call confidence score to a nuisance call threshold. Based on the call confidence score exceeding or falling below the nuisance call threshold, the call analyzer 136 may determine whether the call is to be identified as a nuisance call.

With reference again to the previously introduced example where the call analyzer 136 computed a call confidence score of 79, if calls exceeding the nuisance call threshold are identified as nuisance calls and the nuisance call threshold is 75, the call analyzer 136 compares 79 to 75 to determine that a nuisance call has been detected.

If a nuisance call is detected (decision 212, "YES" branch), the call analyzer 136 may manage the call (step 214). The call analyzer 136 may manage an incoming call by rejecting an incoming call, adding the caller to a block list, asking the caller to take the user off of a calling list, notifying parties, etc. In embodiments, the call analyzer 136 may accept or reject the incoming call based on the user preferences received above and notify parties of the result. In some embodiments, a user may wish not to be notified by the call analyzer 136 of an incoming call suspected to be a nuisance call. In these embodiments, the call analyzer 136 may simply reject the incoming phone call without notifying any parties. In other embodiments, the call analyzer 136 may display its call management decision on a user's smart device 120 or other device, such as their smart phone, smart tablet, augmented reality glasses, smart watch, etc. The display may incorporate the user's user interface settings and preferences, as discussed earlier. Notification may be via any message sending platform such as email, text message, or any social media platforms.

With reference again to the previously introduced example where the call analyzer 136 identifies the call as a nuisance call, the call analyzer 136 rejects the incoming phone call based on the received user preferences.

If a nuisance call is not detected (decision 212, "NO" branch), the call analyzer 136 may allow the call through to the user (step 216). In the event that a nuisance call is not detected, the call analyzer 136 may allow a call through to ring or notify a user.

The call analyzer 136 may evaluate and modify the models (step 218). In the example embodiment, the call analyzer 136 may verify whether an incoming call was a nuisance call in order to provide a feedback loop for modifying the call analyzing models 134. In embodiments, the feedback loop may simply provide a means for a user or administrator to indicate whether the call was in fact a nuisance call. For example, the call analyzer 136 may prompt a user to select an option indicative of whether an incoming call was a nuisance call. The option may comprise a toggle switch, button, slider, etc. that may be selected by the user manually by hand using a button/touchscreen/etc., by voice, by eye movement, and the like. Based on the call analyzer 136 properly or improperly identifying the call as nuisance, the call analyzer 136 may modify the call analyzing models 134, as well as update the contact databases 132. In other embodiments, the call analyzer 136 may infer or deduce whether a nuisance call was properly identified. For example, if the user immediately disconnects from an incoming call, the call analyzer 136 may infer that the call was a nuisance call. In addition, the call analyzer 136 may interpret user dialogue via natural language processing to determine that the call is a nuisance call. For example, if the user says, "no thank you, and please remove me from your calling list," then the call analyzer 136 may identify the call as a nuisance call and adjust the call analyzing models 134. Based on feedback received in the above or any other manners, the call analyzer 136 may then modify the call analyzing models 134 and/or the contact databases 132.

With reference again to the previously introduced example where the call analyzer 136 rejected the incoming phone call, the user indicates in his weekly review of rejected calls that a call from a foreign area code is not nuisance, and the call analyzer 136 adjusts the call analyzing models 134 and the contact databases 132.

Figure 3:
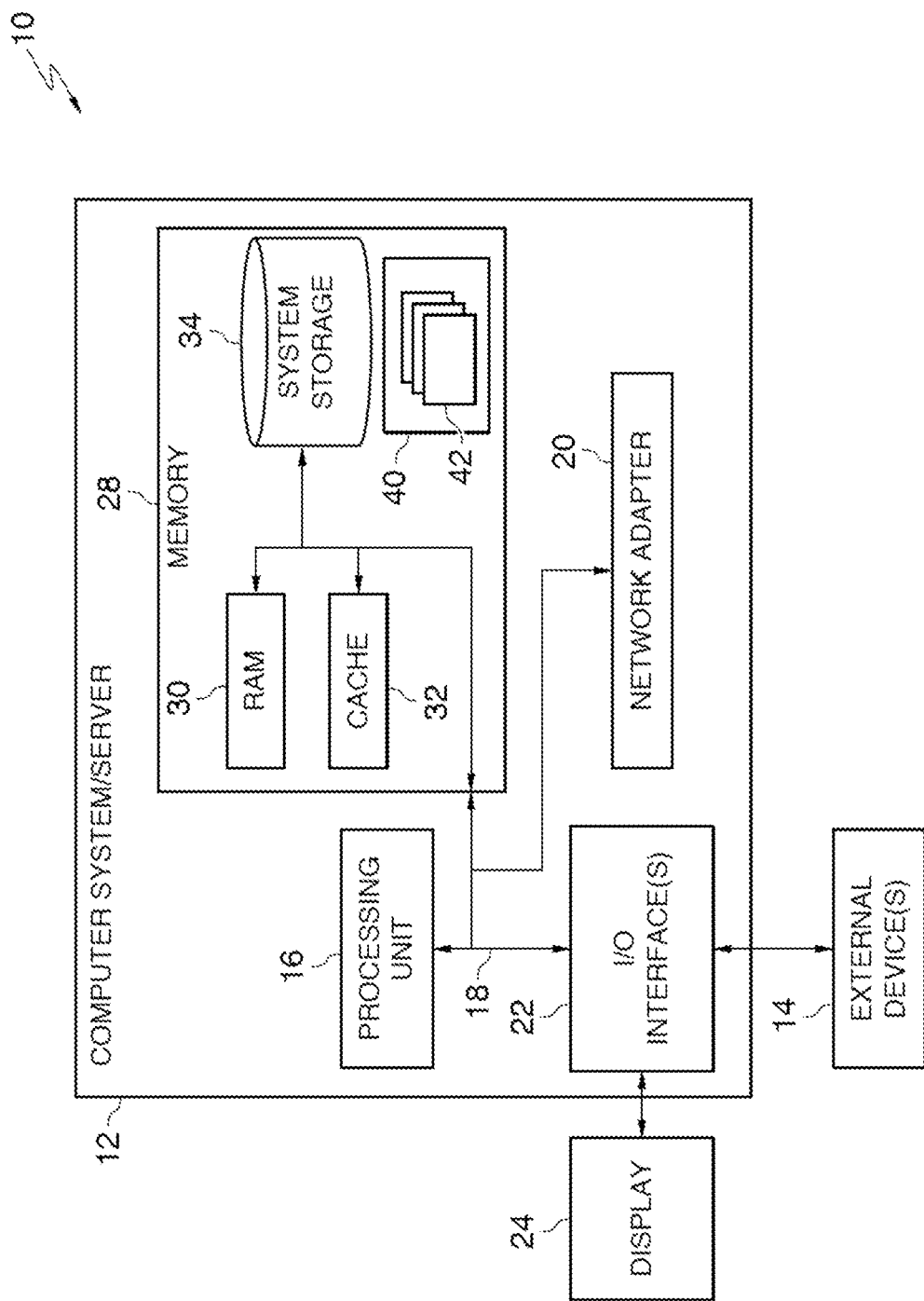
FIG. 3 depicts an exemplary block diagram depicting the hardware components of the nuisance call management system 100 of FIG. 1, in accordance with the exemplary embodiments.

FIG. 3 depicts a block diagram of devices within the call analyzer 136 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
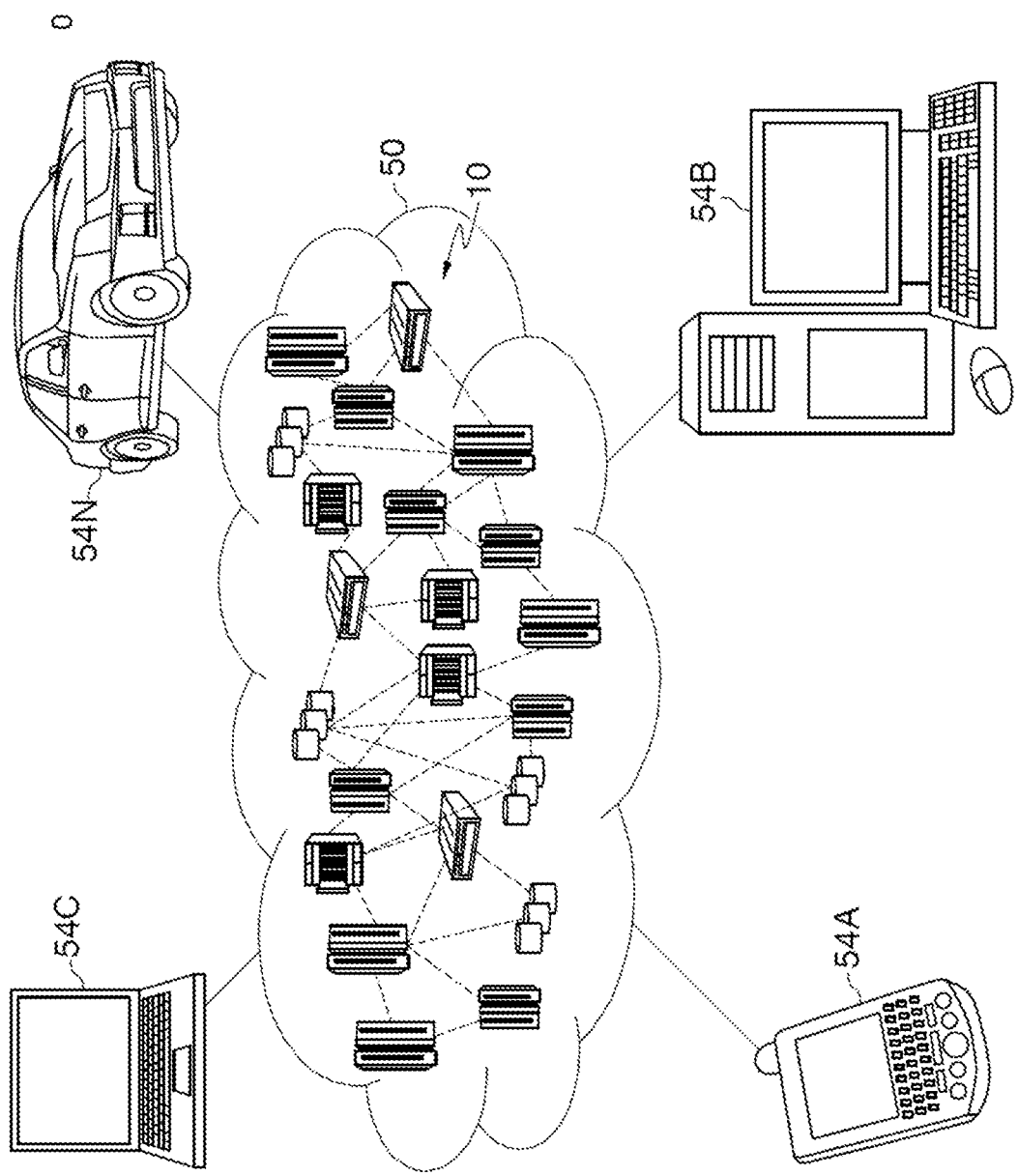
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
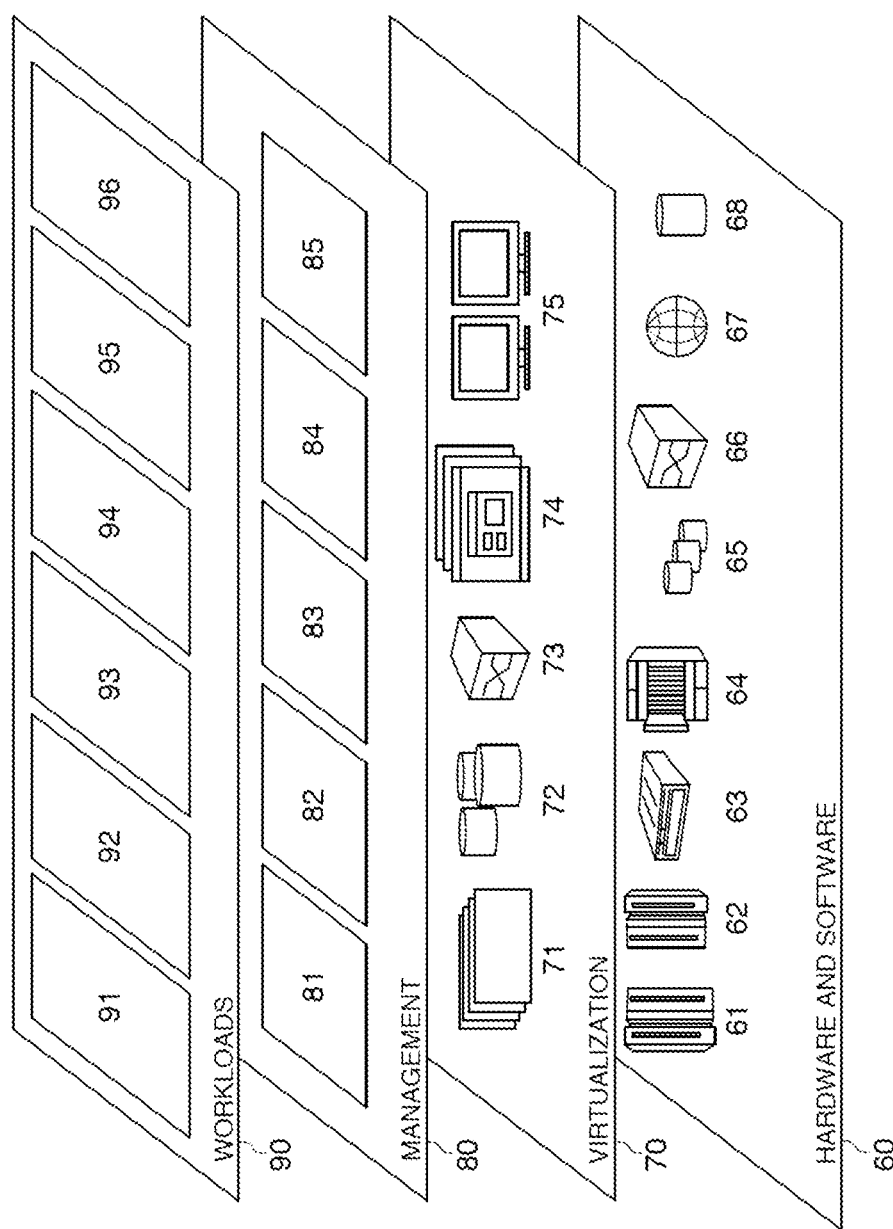
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and nuisance call management 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for managing nuisance calls, the method comprising:
    one or more processors collecting data from a call;
    extracting two or more features from the collected data, wherein the two or more features include at least one feature selected from a group consisting of caller faceprint and caller fingerprint, and at least one feature selected from a group consisting of delay, inflection, background noise, and static;
    identifying the call as a nuisance call based on applying one or more models to the extracted two or more features; and
    asking a caller of the call to remove a recipient of the call from a call list based on identifying the call as a nuisance call.

2. The method of claim 1, wherein the one or more models correlate the one or more features with the likelihood of the call being the nuisance call.

3. The method of claim 1, further comprising:
    receiving feedback indicative of whether the nuisance call was properly identified; and adjusting the model based on the received feedback.

4. The method of claim 1, further comprising:
    prompting the caller of the call to provide a name.

5. The method of claim 4, further comprising:
    determining a call topic, and wherein the one or more extracted features include the call topic.

6. The method of claim 1, wherein the two the one or more features include features selected from a group comprising a include features selected from a group comprising a name, username, phone number, IP address, MAC address, web address, email
    address, geography, serial number, sample audio recording, sample video recording, caller faceprint, caller voiceprint, caller fingerprint, and caller content, delay, silence, tone, inflection, background noise, and static.

7. A computer program product for managing nuisance calls, the computer program product comprising:
    one or more non-transitory computer-readable storage media and program instructions stored on the one or more non-transitory computer-readable storage media capable of performing a method, the method comprising:

one or more processors collecting data from a call;

extracting two or more features from the collected data, wherein the two or more features include at least one feature selected from a group consisting of caller faceprint and caller fingerprint, and at least one feature selected from a group consisting of delay, inflection, background noise, and static;

identifying the call as a nuisance call based on applying one or more models to the extracted two or more features; and asking a caller of the call to remove a recipient of the call from a call list based on identifying the call as a nuisance call.

8. The computer program product of claim 7, wherein the one or more models correlate the one or more features with the likelihood of the call being the nuisance call.

9. The computer program product of claim 7, further comprising:

receiving feedback indicative of whether the nuisance call was properly identified; and adjusting the model based on the received feedback.

10. The computer program product of claim 7, further comprising:

prompting the caller of the call to provide a name.

11. The computer program product of claim 10, further comprising:

determining a call topic, and wherein the one or more extracted features include the call topic.

12. The computer program product of claim 7, wherein the two the one or more features include features selected from a group comprising a include features selected from a group comprising a name, username, phone number, IP address, MAC address, web address, email address, geography, serial number, sample audio recording, sample video recording, caller faceprint, caller voiceprint, caller fingerprint, and caller content, delay, silence, tone, inflection, background noise, and static.

13. A computer system for managing nuisance calls, the computer system comprising:

one or more computer processors, one or more computer-readable storage media, and program instructions stored on the one or more of the computer-readable storage media for execution by at least one of the one or more processors capable of performing a method, the method comprising:

one or more processors collecting data from a call;

extracting two or more features from the collected data, wherein the two or more features include at least one feature selected from a group consisting of caller faceprint and caller fingerprint, and at least one feature selected from a group consisting of delay, inflection, background noise, and static;

identifying the call as a nuisance call based on applying one or more models to the extracted two or more features; and asking a caller of the call to remove a recipient of the call from a call list based on identifying the call as a nuisance call.

14. The computer system of claim 13, wherein the one or more models correlate the one or more features with the likelihood of the call being the nuisance call.

15. The computer system of claim 13, further comprising: receiving feedback indicative of whether the nuisance call was properly identified; and adjusting the model based on the received feedback.

16. The computer system of claim 13, further comprising: prompting the caller of the call to provide a name.

* * * * *